US010699684B2

(12) United States Patent
Wood et al.

(10) Patent No.: US 10,699,684 B2
(45) Date of Patent: Jun. 30, 2020

(54) METHOD FOR CREATING AUDIO TRACKS FOR ACCOMPANYING VISUAL IMAGERY

(71) Applicant: KODAK ALARIS INC., Rochester, NY (US)

(72) Inventors: Mark D. Wood, Rochester, NY (US); Peter D. Wood, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 15/888,867

(22) Filed: Feb. 5, 2018

(65) Prior Publication Data
US 2018/0226063 A1    Aug. 9, 2018

Related U.S. Application Data

(60) Provisional application No. 62/455,295, filed on Feb. 6, 2017.

(51) Int. Cl.
| | |
|---|---|
| *G10H 1/00* | (2006.01) |
| *G10H 1/36* | (2006.01) |
| *G11B 27/031* | (2006.01) |
| *G11B 27/10* | (2006.01) |
| *G11B 27/28* | (2006.01) |

(52) U.S. Cl.
CPC ........... *G10H 1/0025* (2013.01); *G10H 1/368* (2013.01); *G11B 27/031* (2013.01); *G11B 27/102* (2013.01); *G11B 27/28* (2013.01); *G10H 2210/005* (2013.01)

(58) Field of Classification Search
CPC .............. G10H 1/0025; G10H 1/368; G10H 2210/005; G11B 27/031; G11B 27/28; G11B 27/102

USPC .......................................................... 84/634
See application file for complete search history.

(56) References Cited

U.S. PATENT DOCUMENTS

| | | | | |
|---|---|---|---|---|
| 6,072,480 A | * | 6/2000 | Gorbet .................... | G06F 16/40 715/730 |
| 7,754,959 B2 | * | 7/2010 | Herberger .............. | G10H 1/368 84/601 |
| 8,357,847 B2 | * | 1/2013 | Huet ..................... | G10H 1/0025 84/609 |
| 9,495,608 B2 | * | 11/2016 | Wang ................... | G06K 9/4652 |

(Continued)

OTHER PUBLICATIONS

Ackerman et al., "Algorithmic Songwriting with ALYSIA," International Conference on Computational Intelligence in Music, Sound, Art and Design (EvoMUSART), 2017.

(Continued)

*Primary Examiner* — Jeffrey Donels
(74) *Attorney, Agent, or Firm* — Hogan Lovells US LLP (57) ABSTRACT

Methods of creating one or more audio objects to accompany a sequence of multimedia objects are disclosed. According to one embodiment, the method includes using a processor to analyze the multimedia objects and corresponding recorded metadata to generate derived metadata. The method further receives a selection of one or more analysis tools that are configured to analyze the recorded and derived metadata. Next, a selected subset of multimedia objects are identified and sequenced, which will ultimately be coupled to and accompanied by one or more audio objects. Lastly, an embodiment of the present invention generates an audio track to accompany the selected subset of multimedia objects.

17 Claims, 7 Drawing Sheets

(56) References Cited

U.S. PATENT DOCUMENTS

| | | | |
|---|---|---|---|
| 2002/0134219 A1* | 9/2002 | Aoki | G10H 1/0025 84/609 |
| 2004/0027369 A1* | 2/2004 | Kellock | G11B 27/034 715/716 |
| 2008/0306995 A1 | 12/2008 | Newell et al. | |
| 2011/0305395 A1 | 12/2011 | Takayama et al. | |
| 2014/0317480 A1 | 10/2014 | Chau et al. | |

OTHER PUBLICATIONS

Chu et al., "Song From Pi: A Musically Plausible Network for Pop Music Generation," ICLR 2017, pp. 1-9.
Fernandez et al., "AI Methods in Algorithmic Composition: A Comprehensive Survey," Journal of Artificial Intelligence Research, 48 (2013), pp. 513-582.
Davis et al., "Generating Music from Literature," Mar. 10, 2014.
Kiros et al., "Skip-Thought Vectors," http://papers.nips.cc/paper/5950-skip-thought-vectors.pdf, pp. 1-9.
Mohammad et al, "Emotions Evoked by Common Words and Phrases; Using Mechanical Turk to create an Emoticon Lexicon," http://saifmohammad.com/WebPages/NRC-Emotion-Lexicon.htm.
Wood, "Matching Songs to Events in Image Collections," 2009 IEEE International Conference on Semantic Computing, pp. 95-102.
International Search Report dated May 4, 2018 and issued in PCT/US2018/016882.

* cited by examiner

| Feature | Description |
|---|---|
| Contrast | Characterization of the degree of contrast within an image or set of images |
| Saturation | Characterization of the degree of saturation |
| Brightness | Characterization of the degree of illumination of an image or set of images |
| Dominant colors | Characterization of the dominant colors in an image or set of images |
| # of people | Characterization of the size of the group: single person, couple, small group, large group |
| Face size | Close up, portrait, small |
| Facial expression | Smile, shock, surprise, anger, etc. |
| Demographic tags | Age, gender, ethnicity, race |
| Scene tags | Semantic labels describing the setting, such as beach, mountain, urban, indoor |
| Object tags | Semantic labels identifying objects recognized in the image, such as pets, wild animals, cars, food, etc. |
| Location | Place name and geospatial feature type (e.g., park, etc.) |
| Temporal | Point in time or start/end, including recognition of holidays and special days |
| Sentiment | Semantic labels identifying emotion |

| Quality | Description |
|---|---|
| Tonality | Major or minor |
| Key | The key in which the music is generated, e.g, C Major |
| Tempo | The speed at which the music is played, specifically, the number of beats per minute |
| Time signature | |
| Metre | The number beats per measure of music |

| Quality | Description |
|---|---|
| Chord and octave | The set of notes to be typically simultaneously played, where the octave determines the precise pitch |
| Timbre | Tonal quality of the sound |
| Loudness | The volume or sound intensity; may be a function of time |
| Duration | Length the notes are to be played |
| Voices | The number of simultaneously heard instruments playing typically but not necessarily distinct sounds |

METHOD FOR CREATING AUDIO TRACKS FOR ACCOMPANYING VISUAL IMAGERY

CROSS REFERENCE OF RELATED APPLICATIONS

This application claims the benefit of U.S. Provisional Application No. 62/455,295 filed on Feb. 6, 2017 and hereby incorporates by disclosure thereof in its entirety.

FIELD OF THE INVENTION

This invention pertains to multimedia authoring methods, systems, software, and product distribution media. A particular embodiment of the present invention automatically generates one or more audio tracks to be played in conjunction with viewing a set of digital still or video imagery.

BACKGROUND OF THE INVENTION

The proliferation of low cost and high quality digital capture devices such as digital cameras and smart phones has resulted in vast collections of individual and shared digital imagery, both still and video. Viewing the media assets in these ever-growing collections has become increasingly difficult due to the sheer volume of content. However, recently mechanisms for automatically or semi-automatically selecting and presenting desired subsets of the collections have been made available, enabling these subsets to be shared and relived. While printing hard copy photo products is often the preferred way to come up with archival keepsakes, in many cases a softcopy rendering is best for spontaneous viewing or for sharing with friends and family. Such soft copy renderings may take many forms, from a simple digital slideshow to an animated presentation of imagery. However, while such presentations stimulate the visual senses, they leave the other human senses unengaged. Accompanying the visual presentation with at least an audio component can result in a more pleasant viewing or playback experience. Even when such softcopy renderings include video assets, and those video assets incorporate an audio track, the snippets may form only a fraction of the overall rendering, and the audio quality associated with the video may be of inferior quality. Fundamentally, viewing digital renderings or slideshows is often boring without an accompanying audio component.

Prior work published as "Matching Songs to Events in Image Collections," (M. D. Wood, 2009 IEEE International Conference on Semantic Computing) described a system for correlating songs from a personal library of music with event-based temporal groupings of image assets by correlating semantic information extracted from the imagery with song lyrics. However, this approach required the presence of a music library annotated with lyrics, and only worked on for songs, not instrumental music.

Prior approaches for creating audio tracks include "Generating Music From Literature" by Davis and Mohammad, wherein the authors describe an approach for automatically generating musical compositions from literary works. That work takes the text of a novel, and synthesizes music based upon the distribution of emotive words. It leverages the NRC Word-Emotion Association Lexicon, a mapping of English language words to emotions which was made via crowdsourcing:
http://www.musicfromtext.com/uploads/2/5/9/9/259-93305/_transprose_final.pdf
http://saifmohammad.com/WebPages/NRC-Emotion-Lexicon.htm The work by Davis and Mohammad includes an analysis of the text of the novel to identify emotion densities, considering the eight emotions of anticipation, anger, joy, fear, disgust, sadness, surprise and trust. The novel is divided into a predetermined number of sections, and the ratio of emotion words to the total number of words in that section is computed, to derive an overall emotional density for that section. Changes in emotional density change the music. The system described by Davis and Mohammad, TransProse, implements a mechanism for generating a sequence of notes based upon changes in emotion in a literary work. While the current invention builds in some respects upon this work in the use of emotive concepts, that is only one aspect of the current invention, and the application is significantly different. Rather than operating over arbitrary groupings of text, the system and method of the present invention operates over sequences of images, grouped logically by theme or temporal constructs. Emotion is only one of many factors considered in the synthesis.

In "Algorithmic Songwriting with ALYSIA," (Margareta Ackerman and David Loker, "Algorithmic Songwriting with ALYSIA," International Conference on Computational Intelligence in Music, Sound, Art and Design (EvoMUSART), 2017), the authors describe a system based upon machine learning for composing lyrical musical pieces. ALYSIA is primarily intended to be a tool, assisting the user in composing and scoring musical pieces, but it is another demonstration of the use of algorithmic tools to automatically compose music. Another example is "Song From PI: A Musically Plausible Network for Pop Music Generation," which uses hierarchical recurrent neural networks, a form of machine learning, to generate music. The authors of this work include a description of an application for generating a song about a solitary image, where they use the literary story composer by Kiros et al. (http://papers.nips.cc/paper/5950-skip-thought-vectors.pdf) to generate text which is then fed into their system to generate music. A comprehensive survey of methods for algorithmically composing music is available as "AI Methods in Algorithmic Composition" by Fernandez and Vico (https://jair.org/media/3908/live-3908-7454-jair.pdf).

There remains a need in the art for a system that is capable of generating an audio component to accompany a softcopy rendering of a series of digital images, particularly a system where the audio is generated in a manner sensitive to the visual, semantic and emotive nature of the image content, each with a potentially different form. In addition, a system is needed that is capable of generating representations that include thematic groupings in addition to the traditional purely sequential groupings.

SUMMARY OF THE INVENTION

According to an embodiment of the present invention, a method of creating one or more audio objects to accompany a sequence of multimedia objects comprises using a processor to analyze the multimedia objects and corresponding recorded metadata to generate derived metadata, applying a selected method to analyze the recorded and derived metadata, identifying and sequencing a selected subset of the multimedia objects, and generating an audio track to accompany the selected subset of multimedia objects. The sequencing of the selected subset of multimedia objects can be based upon temporal event clustering. The method of generating an audio track further comprises identifying recurring thematic patterns within the sequence of multimedia objects, wherein the method of identifying recurring thematic patterns comprises at least one of frequent item set mining, face detection, face recognition, location clustering, object detection, scene classification, activity detection, sentiment analysis, and event classification.

The method of generating an audio track can further comprise a varying musical structure, including at least one of instrumentation, tonality, key, tempo, volume or chord structure, based upon the set of recorded and derived multimedia object metadata, wherein the set of metadata can include an identification of animate and inanimate objects, scenes or activities, and wherein the identification of animate objects includes an identification of the size of the portrayed object. The derived multimedia object metadata can include a determination of visual complexity, depth of field, contrast, brightness and/or saturation of an image in the sequence of multimedia objects. The recorded metadata can include properties such as the lens focal length and/or subject distance.

The method of generating an audio track further comprises sentiment analysis, wherein the sentiment analysis comprises detecting changes in sentiment, wherein the sentiment analysis can include associating sentiments with semantic concepts from image analysis, and wherein the sentiment analysis can include associating sentiments with facial expressions. The identification of animate and inanimate objects can comprise identifying recurring occurrences of objects, scenes or activities that are reflected in corresponding recurring musical elements. The method of generating an audio track can be responsive to a person portrayed in a multimedia asset, a location of where the multimedia asset was captured, or a time when the multimedia asset was captured. The method of generating an audio track can also be responsive to a person listening to the audio track. The method of generating an audio track can also comprise popular pre-recorded songs associated with a detected location, time, activity or person.

DETAILED DESCRIPTION OF THE INVENTION

The invention is inclusive of combinations of the aspects and features described herein. References to "a particular aspect" and the like refer to features that are present in at least one embodiment of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Audio may of course come in many forms. Rich symphonic works currently require the work of a highly skilled composer to generate; repetitive percussive effects require no particular intelligence to generate but quickly become grating. Soundtrack music includes background music such as the type of music intended to accompany video games. In an embodiment of the present invention, soundtrack music denotes a specific genre of music that is pleasant to listen to, but has certain structure simplicity such that it can be automatically generated.

The audio in an embodiment of the present invention is designed to accompany the playback of a series of images, such as a selected set of images from a person's vacation, a family celebration, or a social event. While the generated music may lack the strong melodic structure of a piece composed by a skilled musician, the musical progression follows the image sequence, and is intended to be evocative of the mood represented by the images. Changes in sentiment in the image sequence should be reflected by the musical progression. Similarly, changes in the actors or characters portrayed in the image sequence should likewise be reflected in the synthesized music. Repetitive themes in the imagery should also be reflected in repeated musical constructs.

In order to generate music appropriate to a sequence of images such as those capturing an event, the sequence of imagery is ideally first mapped to a conceptual representation, where the conceptual representation is a graph-based model in an embodiment of the present invention. Each node of the graph provides semantic information for an asset or grouping of assets, and where each link represents containership. This model is commonly represented using the Resource Description Framework ("RDF") data model, although alternate representations are possible.

Figure 1:
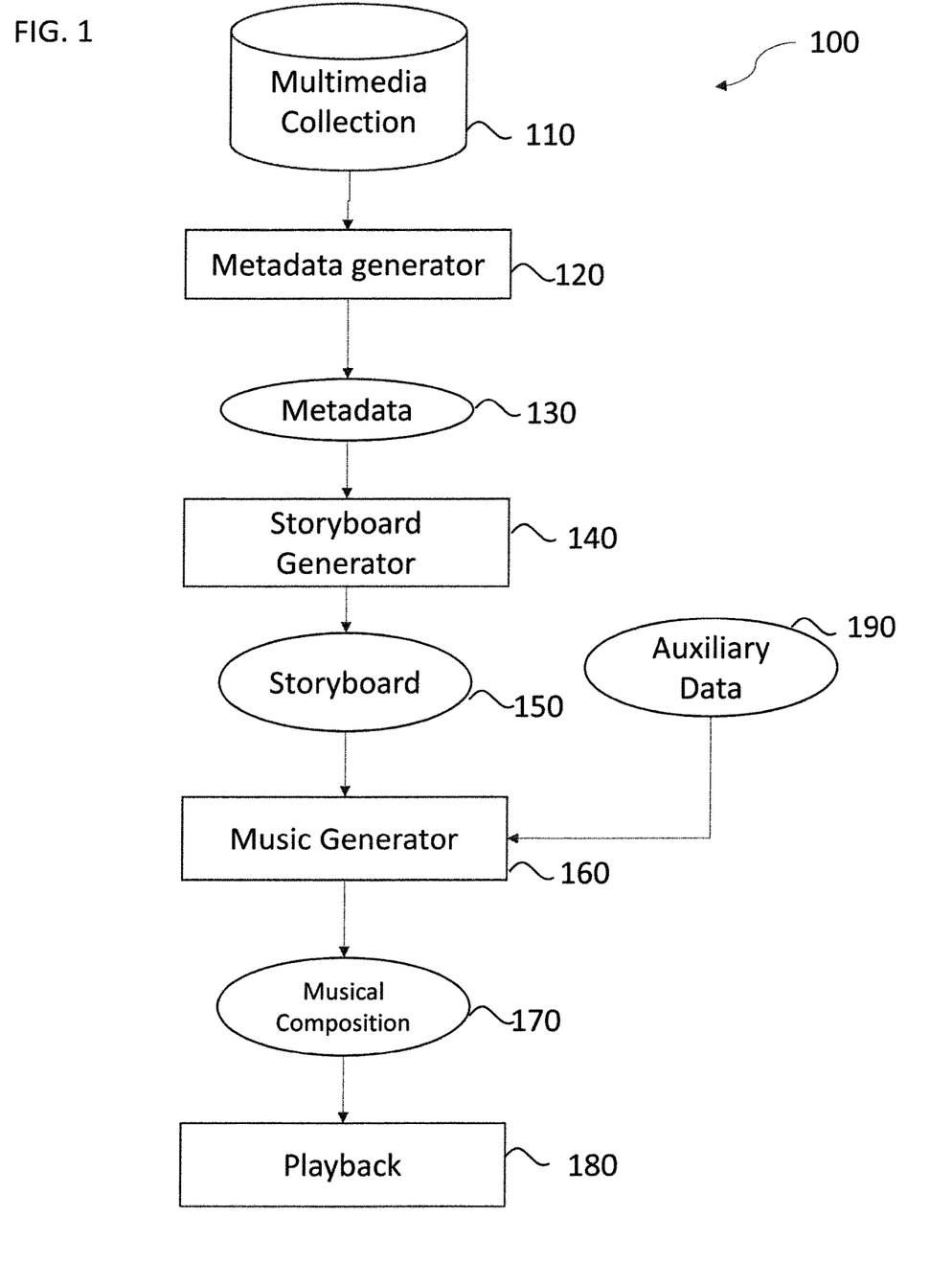
FIG. 1 illustrates a story board flow chart according to the method of the present invention.

FIG. 1 illustrates a flow chart 100 of the basic steps for constructing a playable audio track to accompany a set of imagery. A set of multimedia assets 110 is fed into a metadata generator 120 which produces a set of extracted and derived metadata 130 for the set of assets. This metadata is then processed by a storyboard generator 140 to produce a storyboard, which represents a particular way of grouping and prioritizing the set of assets. The music generator 160 processes the storyboard 150, drawing if necessary upon additional metadata 130 not reflected in the storyboard to produce musical composition 170. The music generator 160 may generate music in the context of a target playback modality, which at a minimum includes a specification for how long the piece needs to be. It may also include characteristics of the playback environment as well as the age and demographics of the viewers. This and other data constitutes auxiliary data 190. For example, if the content is to be viewed in solitude, different music may be generated from music generated to be viewed in a large group setting. Similarly, the age, gender, and demographics of the viewer may all impact the music generation process according to the present invention. The music generator outputs a musical composition 170 which may be represented symbolically for example as a MIDI file, or rendered as an audio file using a format such as WAV or MP3. Finally, the musical composition 170 may be played in conjunction with visual display of the storyboard 150 by the playback component 180.

Figure 2:
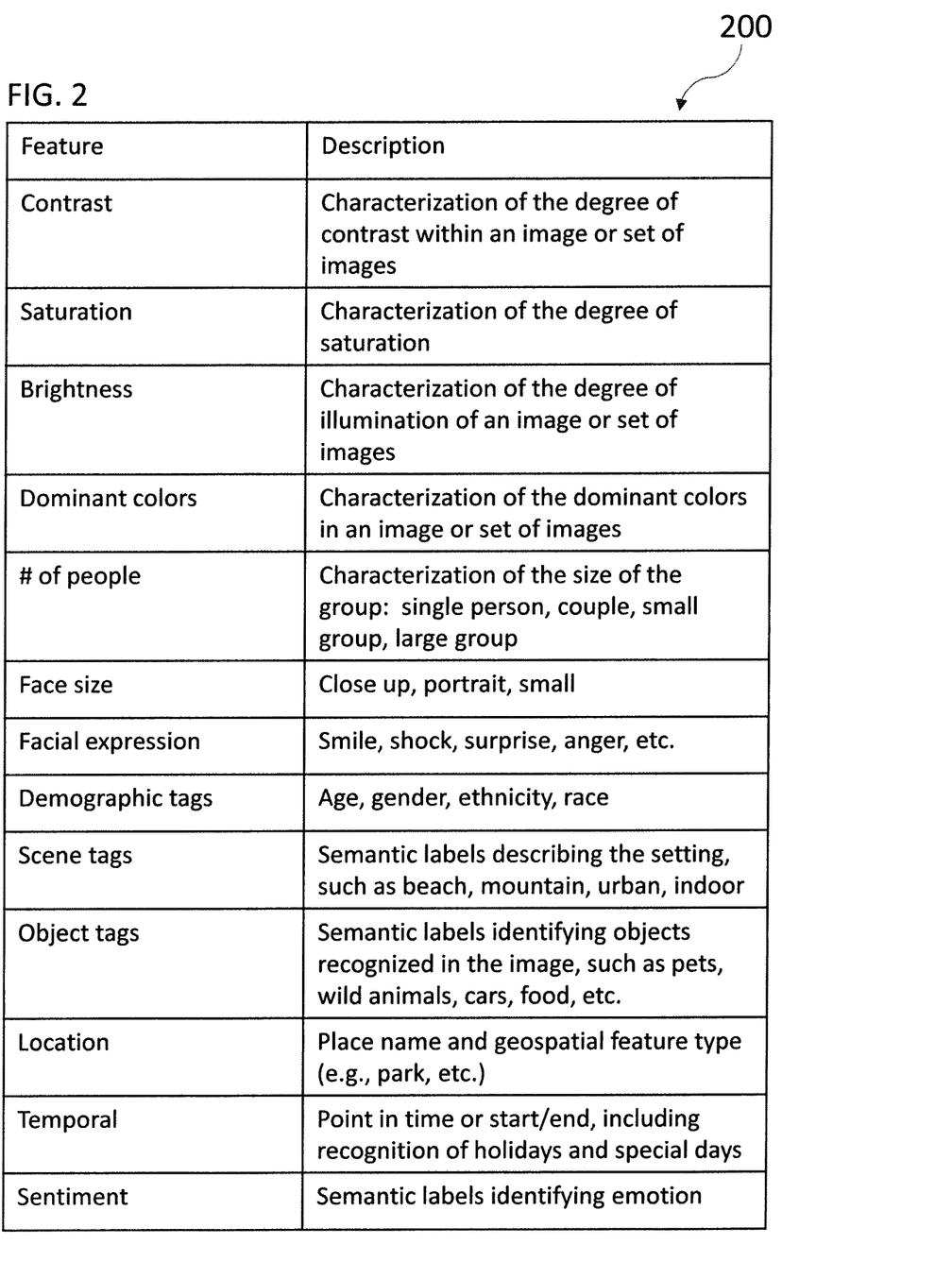
FIG. 2 illustrates a feature table according to the method of the present invention.

The generated metadata includes the information shown in the feature table of FIG. 2. Metadata, generally, encompasses data that is stored and associated with a media asset. This includes recorded, or previously recorded, metadata, which is recorded by the capture device—e.g., capture time, date, and location provided by a digital camera. Metadata also encompasses user-provided metadata, such as that provided via a user interface located on the image capture device or via an image editing application interface that may be accessed through a remote computer. Lastly, metadata encompasses derived metadata, such as metadata computed by face detection or event classification algorithms that are applied to media assets post-capture.

Derived metadata can be generated at the time of storing media asset files on a computer. It can also be generated or derived automatically without a user's knowledge by programmed operation of appropriate metadata-generating software. Such software may be capable of generating many types of metadata based on extrapolating existing metadata (i.e., recorded metadata and user-provided metadata, or previously generated derived metadata) or making inferences from the same. For example, a family tree may be inferred given sufficient existing metadata for known family members who are depicted in stored image media collections. Derived metadata includes metadata deduced from existing metadata of any type. All metadata, whether input by a user, provided by a recording apparatus, or derived by a computer system, can be used by the one embodiment of the system to generate additional metadata based on inferences that can be determined from existing metadata.

EXIF data (Exchangeable Image File format for digital still cameras: EXIF Version 2.2, JEITA CP-3451, Japan Electronics and Information Technology Industries Association, April 2002) is an example of metadata generated by a recording device, which is stored with the captured media asset. For example, a digital camera might include various camera settings associated with an image such as f-stop, speed, and flash information. Other data such as the lens focal length and estimated subject distance may also be recorded.

A growing number of digital cameras, and most smartphones, are capable of recording the latitude and longitude of the image capture location when an image is captured. Such location-based metadata can be very powerful especially when used in concert with other metadata sources. For example, the U.S. Geological Survey's Board on Geographical Names maintains the Geographic Names Information System, which provides a means to map latitude and longitude coordinates to commonly recognized feature names and types. Exemplary location types include "church," "park," and "school." Location metadata may also be used to aid in clustering assets. One embodiment of the present invention can use a system like the Geographic Names Information System to generate derived metadata in the form of location types upon analyzing recorded metadata in the form of latitude and longitude values recorded by the image capture device. For example, a media asset captured in New York's Central Park could have recorded metadata in the form of latitude and longitude values (40.7789° N and 73.9675° W). Metadata generator 120 analyzes the recorded metadata (the latitude and longitude values) to generate derived metadata for that asset in the form of the name of the location—i.e., Central Park.

Low-level image features provide an indication of the visual content of an image. Low-level image features are those computed directly from the pixel content of the image, such as but not limited to the colors, the textures, or the edge (contrast) information. U.S. Pat. No. 6,480,840, to Zhu et al., entitled "Method and Computer Program Product for Subjective Image Content Similarity-based Retrieval," describes determining color features from an image based on the assumption that significantly-sized, coherently-colored regions of an image are perceptually significant. Accordingly, a coherent color histogram is first computed for an image that provides an indication of the number of pixels of a particular color that belong to coherently colored regions. Dominant colors are then determined that occupy a significant proportion (according to a predefined threshold) of the overall pixels. Color classifiers characterize the dominant colors present in an image. Histogram analysis of the luminance channel can also provide a characterization of the relative brightness of an image. U.S. Pat. No. 6,480,840 also describes the determination of texture features that can be used for low-level features in accordance with the present invention. The perceived visual complexity of an image may be measured according to various techniques described in the literature, such as feature congestion, subband entropy and edge density. A more recent metric specific for photographic imagery is the complexity measure described by Corchs et al. in "Predicting Complexity Perception of Real World Images."

Scene classifiers identify or classify a scene into one or more scene types (e.g., beach, indoor, etc.) or one or more activities (e.g., running, swimming, eating, etc.). Scene classifying methods may also be applied to media assets to generate derived metadata. Details of such methods are described in U.S. Pat. No. 6,282,317, entitled "Method for Automatic Determination of Main Subjects in Photographic Images"; U.S. Pat. No. 6,697,502, entitled: "Image Processing Method for Detecting Human Figures in a Digital Image Assets"; U.S. Pat. No. 6,504,951, entitled "Method for Detecting Sky in Images"; U.S. Patent Application Publication No. US 2005/0105776, entitled "Method for Semantic Scene Classification Using Camera Metadata and Content-Based Cues"; U.S. Patent Application Publication No. US 2005/0105775, entitled "Method of Using Temporal Context for Image Classification"; and U.S. Patent Application Publication No. US 2004/0037460, entitled "Method for Detecting Objects in Digital Image Assets."

Materials class features provide an indication of various materials (e.g., water, grass, snow etc.) included in the digital image. In one embodiment, the materials class features are determined using a supervised learning approach, such as that described by Carneiro et al. in the article entitled "Supervised Learning of Semantic Classes for Image Annotation and Retrieval" (IEEE Transactions on Pattern Analysis and Machine Intelligence, Vol. 29, pp. 394-410, 2007). Determining materials class features is yet another aspect of the present invention that may be implemented to generate further derived metadata. Another method for determining materials class features that can be used in accordance with the present invention is described by Boutell et al. in the article "Learning Multi-label Scene Classification" (Pattern Recognition, Vol. 37, pp. 1757-1771, 2004). This method by Boutell et al. is designed to determine materials class features for digital images that can contain multiple materials classes such as water, sand and blue sky which might appear together in a beach scene. The method for detecting sky in an image as described in U.S. Pat. No. 6,504,951, to Luo et al., entitled "Method for Detecting Sky in Images" can also be used to determine materials class features in some embodiments.

Scene and material classifiers provide a more specialized approach for associating semantic tags with an image. More recent approaches for associating semantic tags with image content rely upon machine learning models trained using deep learning; commercial semantic taggers providing such functionality include the Microsoft Cognitive Services API, the Google Computer Vision and API, and services offered by Clarifai. These services analyze a given image and return back a set of associated semantic tags or labels, typically with an associated confidence score for each label. Some of these systems have been trained to recognized thousands of distinct concepts. In addition, some systems may further describe the content of an image in a phrase or sentence structure. The returned semantic tags may correspond to objects, such as "Christmas tree" or "cat." They may also represent scene types, such as "beach", "urban" or "nature." These existing services may return emotive tags, such as "fun," "cute" or "love"; or activity tags, such as "sitting" or "running." Some systems such as the Microsoft Cognitive Services API can also provide textual descriptions for images—English phrases or sentences that describe the content of an image. A naïve approach to solving the problem addressed by the current invention would be to simply feed the textual descriptions generated by the Microsoft Cognitive Services API into the TransProse system developed by Davis and Mohammad. However, this approach would fail to exploit the other benefits described in this work, including the ability to develop recurring motifs.

Facial features in images are detectable and indicate the presence of human faces. Methods for detecting human faces are well known in the art of digital image processing. For example, a face detection method that can be used in accordance with the present invention is described by Jones et al. in the article entitled "Fast Multi-view Face Detection" (Mitsubishi Electric Research Laboratories, TR2003-96, 2003). Facial features that can be computed from various face detection methods include the number of faces in the image and the approximate sizes and locations of faces in the digital image. One embodiment of the present invention optimizes the methods for detecting faces and analyzing facial features to generate derived metadata.

In an embodiment of the present invention, the facial images can be analyzed to determine additional information about the people appearing in the images, including the estimated age and gender of the persons in the image, using commonly described techniques.

There are also commercially available software products (from companies such as Omron, Luxand, ArcSoft etc.) and open-source software products (such as OpenCV, Intel Perceptual Computing) for face detection and characterization. These products can be used for obtaining face-based metadata features such as a count of the number of faces in the image, approximate sizes of faces, locations of faces, estimated age and gender determined from the faces, and people recognized as the same person across images. These commercially available software products also typically provide the ability to characterize the facial expression for detected faces, considering attributes such as the shape of the mouth and the eyes. Facial expression includes a measure to which a person's eyes are open and/or the degree to which the person is smiling. Facial expression can be mapped to one of several canonical emotions using a trained machine learning model.

Face recognition is the identification or classification of a face to an example of a person or a label associated with a person based on facial features as described in U.S. Pat. No. 8,315,463, entitled "User Interface for Face Recognition," issued Nov. 20, 2012; U.S. Pat. No. 7,711,145, entitled "Finding Images With Multiple People or Objects," issued May 4, 2010; and U.S. Patent Application Publication No. US 2007/0098303, entitled "Determining a Particular Person from a Collection," published on May 3, 2007.

Face clustering is a form of face recognition wherein faces are grouped by similarity. With face clustering faces that appear to represent the same person are associated together and given a label, but the actual identity of the person is not necessarily known; face clustering uses data generated from facial detection and feature extraction algorithms to group faces that appear to be similar. This selection may be triggered based on a numeric confidence value. The output of the face clustering algorithm is new metadata, namely, a new object representing the face cluster is created; each media asset containing a face that is part of the face cluster receives a metadata item indicating that the asset contains a person as represented by the face cluster. In some embodiments, the system may be able to associate the face cluster with an identified person, either by the user providing the facial identification or by consulting some auxiliary data source that provides exemplar faces for a given person. Face clustering provides a means for recognizing when the same person is portrayed in different images. Some embodiments may provide a mechanism whereby face clusters may be combined, in the case where distinct face clusters are generated for the same person.

Figure 5:
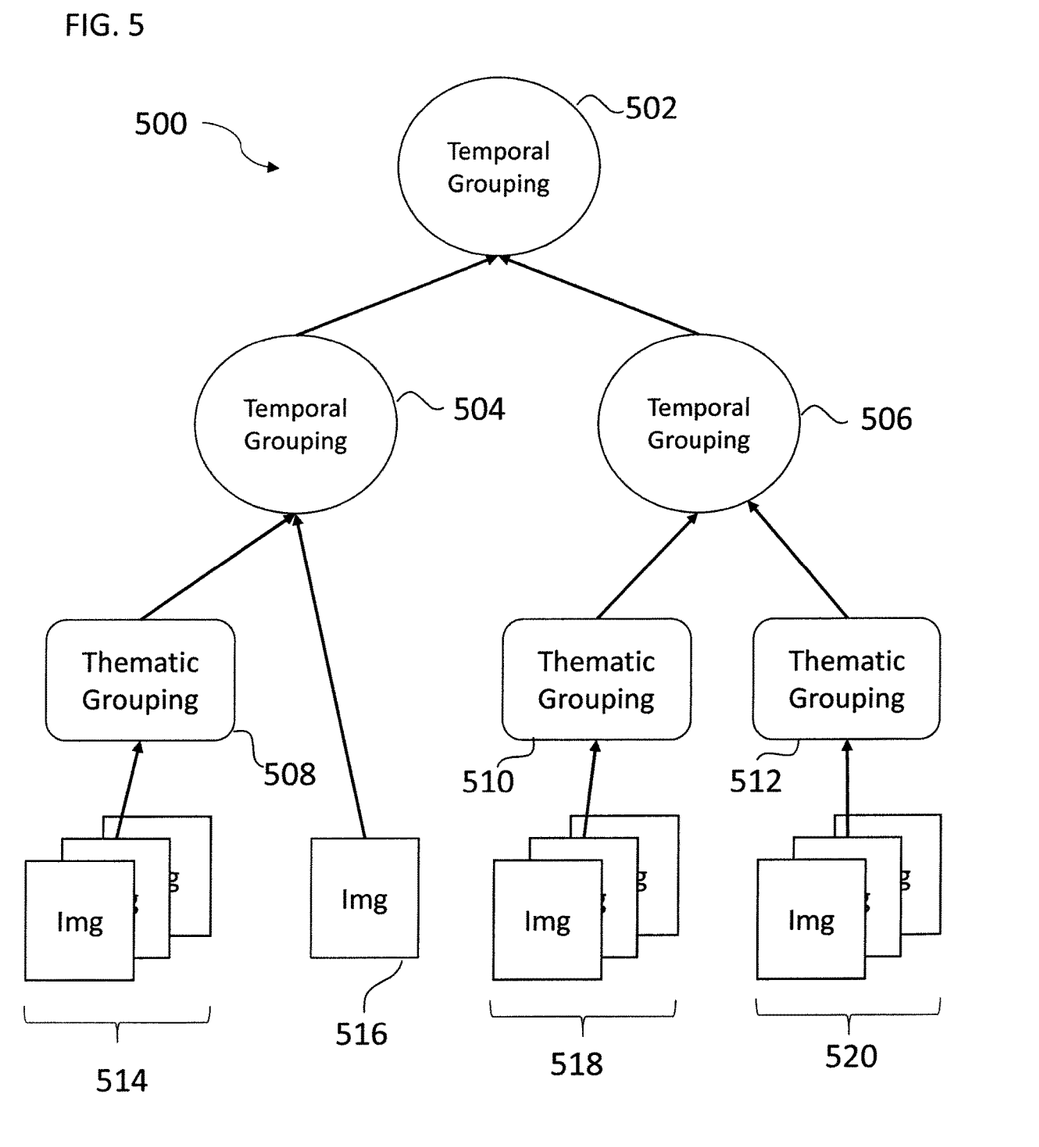
FIG. 5 illustrates an event hierarchy block diagram according to the method of the present invention.

Temporal event clustering of still images and videos is generated by automatically sorting, segmenting, and clustering an unorganized set of media assets into separate temporal super events, events, and subevents, as described in detail in U.S. Pat. No. 6,606,411, entitled "A Method For Automatically Classifying Images Into Events," issued on Aug. 12, 2003, and U.S. Pat. No. 6,351,556, entitled "A Method For Automatically Comparing Content Of Images For Classification Into Events," issued on Feb. 26, 2002. Temporal event clustering algorithms divide a sequence of images into an event hierarchy, which may be represented as a tree as illustrated in FIG. 5. The individual images form the edges of the tree, with decreasing granularity of the grouping occurring as one goes higher up the tree. At the top level or root of the tree is a super-event or event node, representing the entire over which an audio track is to be formed. Super-events typically correspond to multi-day happenings, such as a vacation; an event node typically represents a single day. A vacation might be represented as a single super event, with nested events corresponding to each of the days of the vacation. At a finer level of granularity are subevents; an event may include one or more subevents, where each subevent represents images taken in a similar setting and typically having some degree of visual similarity. A finer level of granularity is the near-dup, representing a set of images that capture essentially the same moment in time. A photographer taking portrait pictures, for example, will often take more than one picture in an attempt to get one with just the right expression. However near dups may occur in other situations, for example, as a result of a photographer changing camera capture settings, etc. Other types of event hierarchies are possible, including those with more or less degrees of granularity.

Detected events may be classified into a semantic category such as described in detail in U.S. Patent Application Publication No. US 2007/0008321, entitled "Identifying Collection Images With Special Events," filed on Jul. 11, 2005. In one embodiment of the present invention, detecting events serves to expand the library of derived metadata stored in metadata repository 130. Media assets can be associated with one another because they depict the same event. Such media assets may be classified together as depicting the same event because they share the same location, setting, or activity per a unit of time, and are intended to be related, according to the expected intent of the user or group of users. Within each event, media assets can also be clustered into separate groups of relevant content called subevents. While media assets may be generally classified as depicting the same event because they share the same setting or activity, media assets in a subevent share more specific similar content within the event, such as they were captured at roughly the same time and optionally have some measure of visual similarity. In U.S. Pat. No. 8,611, 677, issued Dec. 17, 2013, Das et al. have described a method for classifying images or videos in a multimedia collection into one of several event categories, such as vacation, celebration or family moment, using a combination of time-based and content-based features. Video concept classification is described in U.S. Pat. No. 8,135,221, which issued on Mar. 13, 2012, to Jiang et al. Multiple events themselves may also be clustered into larger groups called super-events. U.S. Pat. No. 8,611,677 also describes a method for computing super-events from the output of event clustering using a density-based clustering approach. As an example of the different event categories, consider a weekend vacation trip with morning, afternoon, and evening activities each day. Each of the different activities might constitute a separate subevent, with the subevents of a day constituting an event and the entire weekend constituting a super-event. The exact grouping will depend on the capture time of the various assets and how they are clustered.

Auxiliary data such as regional or personal calendar information may be consulted to provide further semantic context to events. For example, pictures captured on December $25^{th}$ in some cultures are likely to be related to Christmas, pictures captured on or near a person's birthday featuring that person are likely to be birthday pictures, etc. The event category data provided by the invention described in U.S. Pat. No. 8,611,677 can further enhance the likelihood of such associations.

The growing prominence of social platforms such as Facebook® and Instagram® provide new sources of user-provided metadata, based upon how media objects are used and shared. For example, Facebook® is a widely used social network that provides a means for users to upload and share images and video objects, with optional titles or captions. The fact that a user has even shared a media object indicates that the object has greater value to the user. Facebook® further provides a means for people with whom media objects are shared to comment on the object, or to express interest in the object by "liking" it. Comments may be further analyzed to associate emotions. In addition, Facebook® users can tag people within images. All this information about media assets and their usage is accessible to applications via the Facebook® platform API. Other social platforms such as Flickr® and Instagram® provide comparable APIs.

U.S. Pat. No. 8,625,904 describes the computation of various types of metadata and the discretization of feature values into a finite number of levels. This patent also describes a frequent pattern mining step that is used to identify recurring patterns in a metadata database. In one embodiment of the present invention, similar pattern recognition algorithms, or pattern mining methods, are used to identify recurring patterns in the metadata stored in metadata repository 130. The frequent pattern mining step identifies a set of frequent itemsets, where each of the frequent itemsets is a co-occurring feature descriptor group that occurs in at least a predefined fraction of the digital images. Algorithms for frequent itemset mining in a transactional database are well-known in the art. For example, an implementation of the Eclat algorithm, described by Borgelt in the article entitled "Efficient Implementations of Apriori and Eclat" (Proc. of IEEE ICDM Workshop on Frequent Itemset Mining Implementations, 2003), can be used to mine frequent itemsets. The images corresponding to each frequent itemset generally represent a theme in the image collection. For example, a frequent itemset corresponding to the color features "orange" and "red," and time-based features "evening" and "summer," may produce a group of images of sunsets. The frequent itemsets detected depends on the images in the image collection and are not pre-defined.

Thematic groupings, as described in U.S. Pat. No. 8,625, 904, group together images or sets of images that share one or more common features, where the features may include any of the items listed in FIG. 2. Frequent item set mining may be used to identify the thematic groupings; alternatively, the system may operate against a set of predetermined possible features known to be of high value. The storyboard 150 of FIG. 1 may include sets of thematic groupings in addition to or instead of the temporal groupings described previously. A given multimedia collection belonging to one or more users may be grouped using event-based and thematic groupings. These grouping may or may not overlap.

Figure 7:
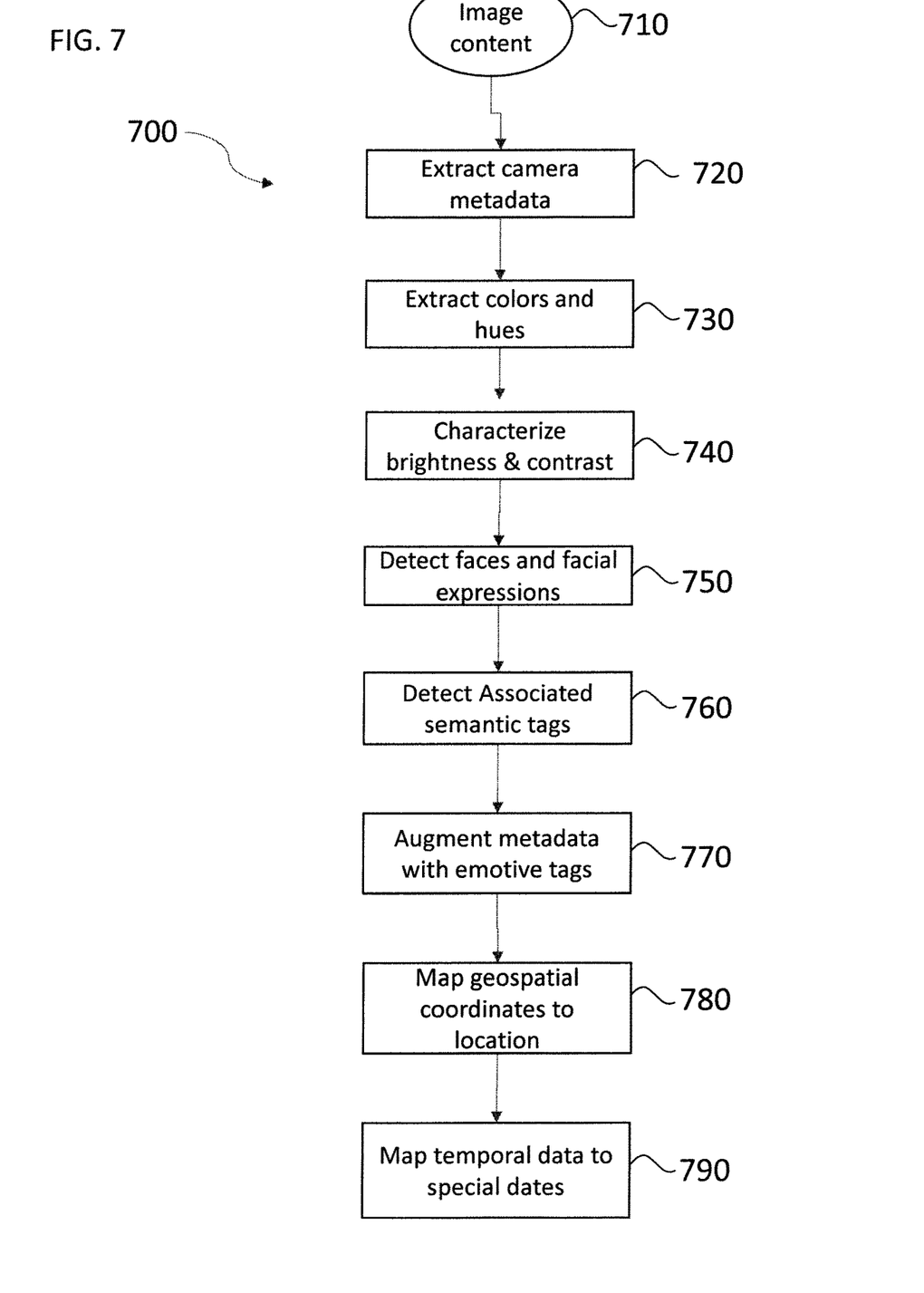
FIG. 7 illustrates a metadata generation flow chart according to the method of the present invention.

The various types of metadata generation are partially summarized in the flow chart 700 of FIG. 7. Image content 710 is processed in step 720 to first extract any metadata captured by the capture device or otherwise already associated with the image content. This may include captions and descriptions. Low level image analysis is conducted in steps 730 extracting colors and hues and in step 740 characterizing brightness, contrast, and edginess of the image. Step 750 detects faces and analyzes facial expressions. Step 760 uses semantic tagging to associate semantic tags with the image. These tags, along with other metadata, are then further associated with emotive tags at step 770. Geospatial data is mapped to place names and geospatial features in step 780, and temporal data is similarly mapped to holidays, anniversaries and other special days in step 790. This figure does not illustrate the clustering operations, such as temporal event clustering and face clustering, which operate over sets of images. Nor does it illustrate the identification of common themes.

A significant building block for this invention is the grouping of sets of consecutive images into thematic groupings. These groupings enable the identification of recurring motifs. In addition, certain thematic groupings can be associated with certain sounds. A hierarchical temporal grouping may be flattened by projecting it to a linear sequence of assets, where the assets are in, typically, chronological order. This sequence may then be analyzed to identify recurring themes.

The story 150 of FIG. 1 represents a particular grouping and prioritization for the set of media assets, and determines how the order in which the assets should be played back or rendered. A method for creating a story (referred here as a storyboard) from a multimedia collection is described further in U.S. Pat. No. 8,934,717. In order to generate the music to be associated with a particular storyboard, an embodiment of the present invention projects the hierarchical structure of the storyboard to a linear progression of assets, that is, a sequence of consecutive images representing the playback order. Note that in some embodiments, a particular playback may include displaying two or more images simultaneously, perhaps as a collage, or perhaps as a picture within a picture. The story provides the basis for specifying which set of assets from a given multimedia collection should be displayed, and in what order, thereby determining the set of imagery for which accompanying audio is to be generated.

Figure 3:
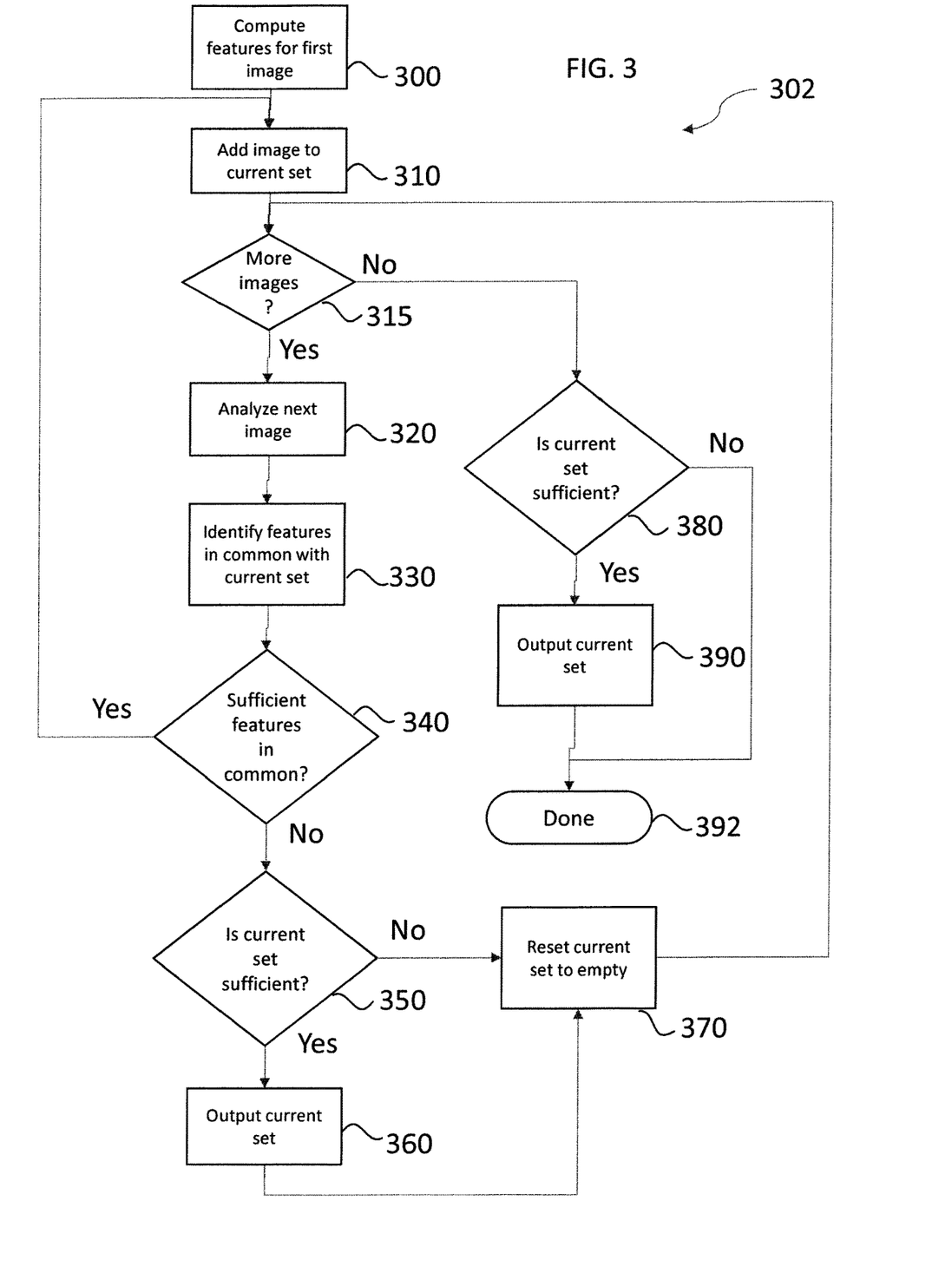
FIG. 3 illustrates a flow chart for forming thematic groupings from a set of consecutive images according to the method of the present invention.

FIG. 3 illustrates a flow chart 302 of a simple algorithm for forming thematic groupings from a set of consecutive images. The features that form a theme include the features listed in FIG. 2. These features may be computed individually or for sets of images, and include the various types of metadata features for images and sets of images described previously.

In step 300 of FIG. 3, the possible thematic features are computed for the first image in the sequence, and the image is added in step 310 to the current set of images, which has the initial value of the empty set. The system verifies that there are more images for testing at step 315; if there are, then the next image is then analyzed at step 320 to extract its features, which are then compared with the current set of features at step 330. If the next image's features are sufficiently similar to the current set's aggregated set of features, as determined in step 340, then execution continues by continuing with step 310, where that image is added to the current set. If the next images are not sufficiently similar, then the system checks at step 350 to see if the current set of images is sufficient. The criteria for sufficiency may depend upon the current set of features; it may also depend upon the sequence. Typically, several images would be required to identify a theme. However, it may also be useful if several preceding images all formed a theme, and then the next image has a distinctly different set of features, to in that case output the image as a singleton. At step 315, if there are not more images for testing, then the method of the present invention continues to step 380, which asks if the current set is sufficient or not. If yes, the current set is output at step 390, and the method is completed at step 392. If no, the method stops at step 392 with the current set excluded. At step 350, if the current set is sufficient, then the current set is output at step 360, and the current set is reset to empty at step 370. If the current set is not sufficient, the current set is reset to empty at step 370. The method of the present invention advances from step 370 back to step 315.

While not illustrated by this algorithm, note that multiple levels of thematic groupings could be formed from a sequence. For example, in a sequence of ten images, the first five could be determined to be shots of couples taken outdoors. Of those five the first three could be selfies and the last two could be taken at a greater distance. The next set of three images could be scenic shots with predominant blues and greens. The last two might not have significant features in common. This could give rise to a thematic hierarchy including a thematic group of couples, which could be further refined to two thematic subgroupings, one of selfies of two individuals, and another of two individuals where the face size is moderately small. Next in the sequence would be a thematic grouping characterized by being scenic shots without detected people and with a high level of blue and green colors. To accommodate such behavior, the algorithm illustrated in FIG. 3 is extended to include a hierarchy of possible thematic sets as the current set. In this alternative embodiment, step 340 determines the degree of commonality between an image and the current feature set hierarchy, computed by performing set intersection operations. The output at step 390 becomes a hierarchy of thematic groupings, as opposed to a linear sequence. For example, given a series of five image $I_1$, $I_2$, $I_3$, $I_4$, and $I_5$, where image $I_1$ has features {A, B, C}, images $I_2$ and $I_3$ have features {B, C}, images $I_4$ and $I_5$ have features {C, D}, all five images share feature D, while images $I_2$ and $I_3$ share features B and C, and images $I_4$ and $I_5$ shares features C and D.

FIG. 5 illustrates a block diagram 500 of some thematic groups within the temporal event hierarchy that might be identified by this algorithm from analyzing the edge nodes of the graph, and the individual image assets. Temporal groupings 502, 504, and 506, thematic groupings 508, 510, and 512, as well as image assets 514, 516, 518, and 520 are shown.

Note also that a more sophisticated version of the algorithm may reorder images in order to preserve an overall thematic structure. For example, it commonly happens that the order images are captured chronologically does not necessarily represent the best order for presenting the images. One can imagine a photographer at a wedding capturing a series of pictures of the bride and groom cutting the cake, and during a lull in the action, capturing a random candid shot that would best be presented before or after the cake cutting photos. Semantic information extracted from the imagery can be used to guide the determination as to whether or not the interjected photo should be ordered in the sequence.

The output from FIG. 3 is a sequence of feature items, where each feature item contains one or more images, and where each feature item is characterized by a set of features, including but not limited to the features described in FIG. 2.

Figure 4A:
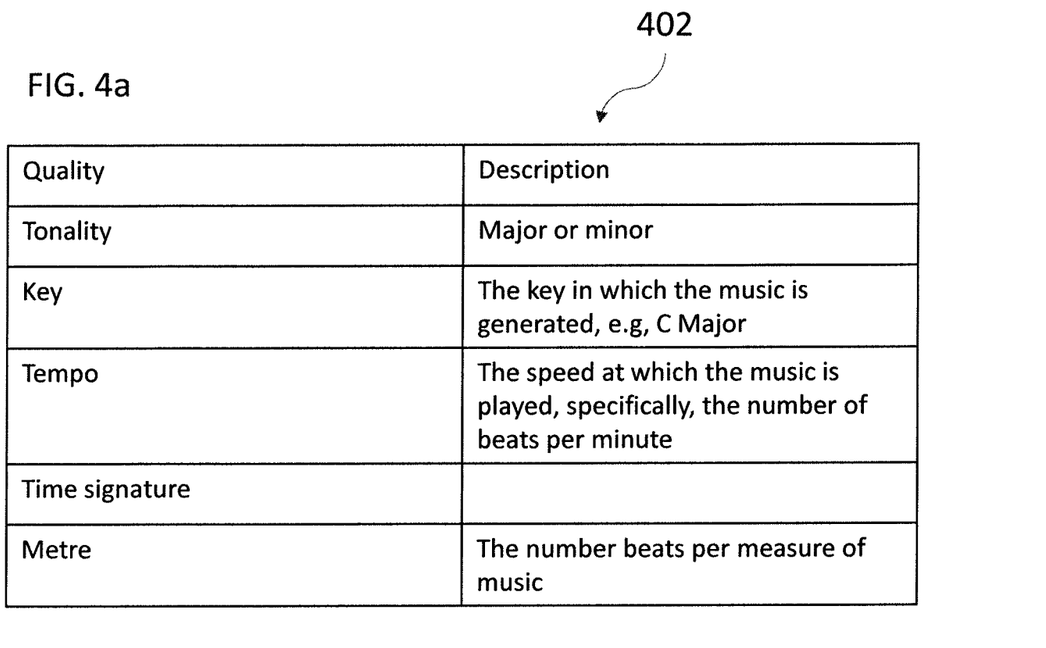
FIG. 4a and FIG. 4b illustrate musical quality tables according to the method of the present invention.
Figure 4B:
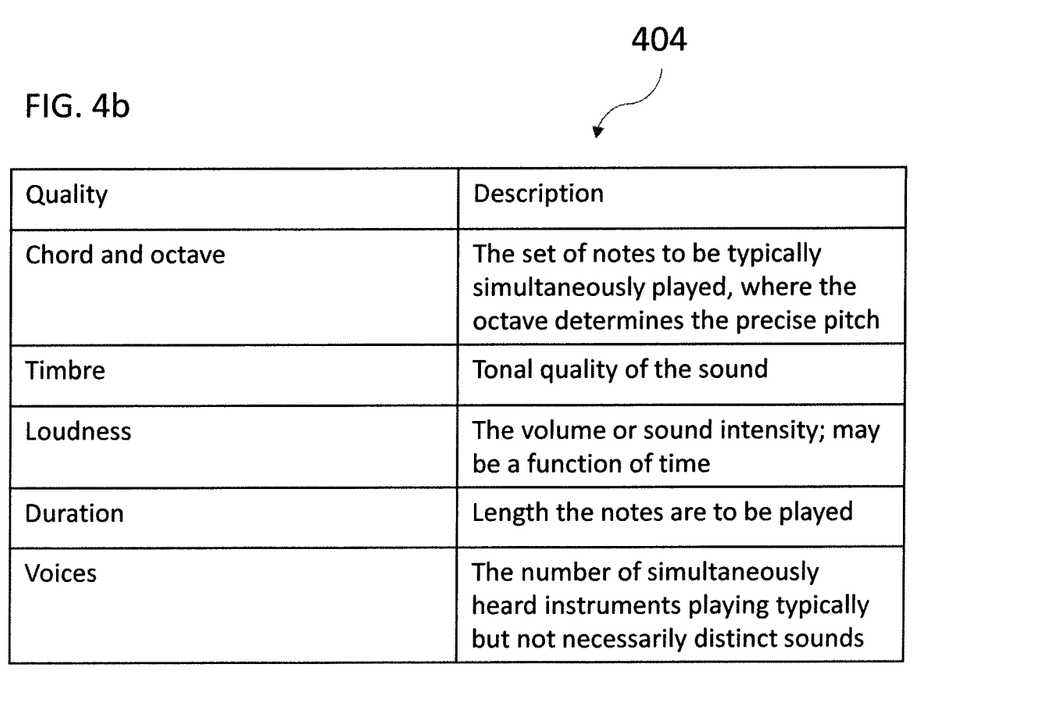

To synthesize a specific composition for a given sequence of feature items or images requires first a determination of the overall musical characteristics for the composition. The quality table 402 of FIG. 4a identifies some overarching musical parameters, although note some of these may vary within a given composition from measure to measure. The synthesized musical composition includes a set of musical elements, where each element is characterized at least in part by the qualities identified in the quality table 404 of FIG. 4b. In an embodiment of the invention, an initial analysis of the image set is conducted to identify a particular strategy that will be followed in synthesizing the subsequent content. This strategy includes elements such as how many voices will be initially present, and how that number will vary over time. Once an overall strategy has been determined, the system can then proceed to synthesize music according to that strategy using the various heuristics and rules previously identified. These steps are illustrated in the flow chart 600 of FIG. 6, where the storyboard 610 (same as 150 of FIG. 1) and the auxiliary data 620 (same as 190 of FIG. 1) are interpreted by step 630 to determine the overall strategy 635, which drives the music synthesizer 640 to produce musical composition 650 (same as 170 of FIG. 7). The music synthesizer takes as input the strategy 635 computed at step 630, along with the storyboard 610 and the auxiliary data 620. The storyboard 610 is assumed to incorporate both the temporal and thematic groupings illustrated in FIG. 5. The strategy 635 includes a determination of the number of key actors (people, other animate objects, or inanimate objects) that should be reflected in the music, along with a timeline indicating when those actors appear. In an embodiment of the present invention, each actor is represented as a distinct voice in the resultant music. Step 641 extracts semantic attributes for a next asset and actor grouping, and step 642 generates notes for a desired number of measures for each asset and actor. Step 643 asks is more groupings are required. If yes, the method proceeds back to step 641. If no, the musical composition is completed at step 650.

Figure 6:
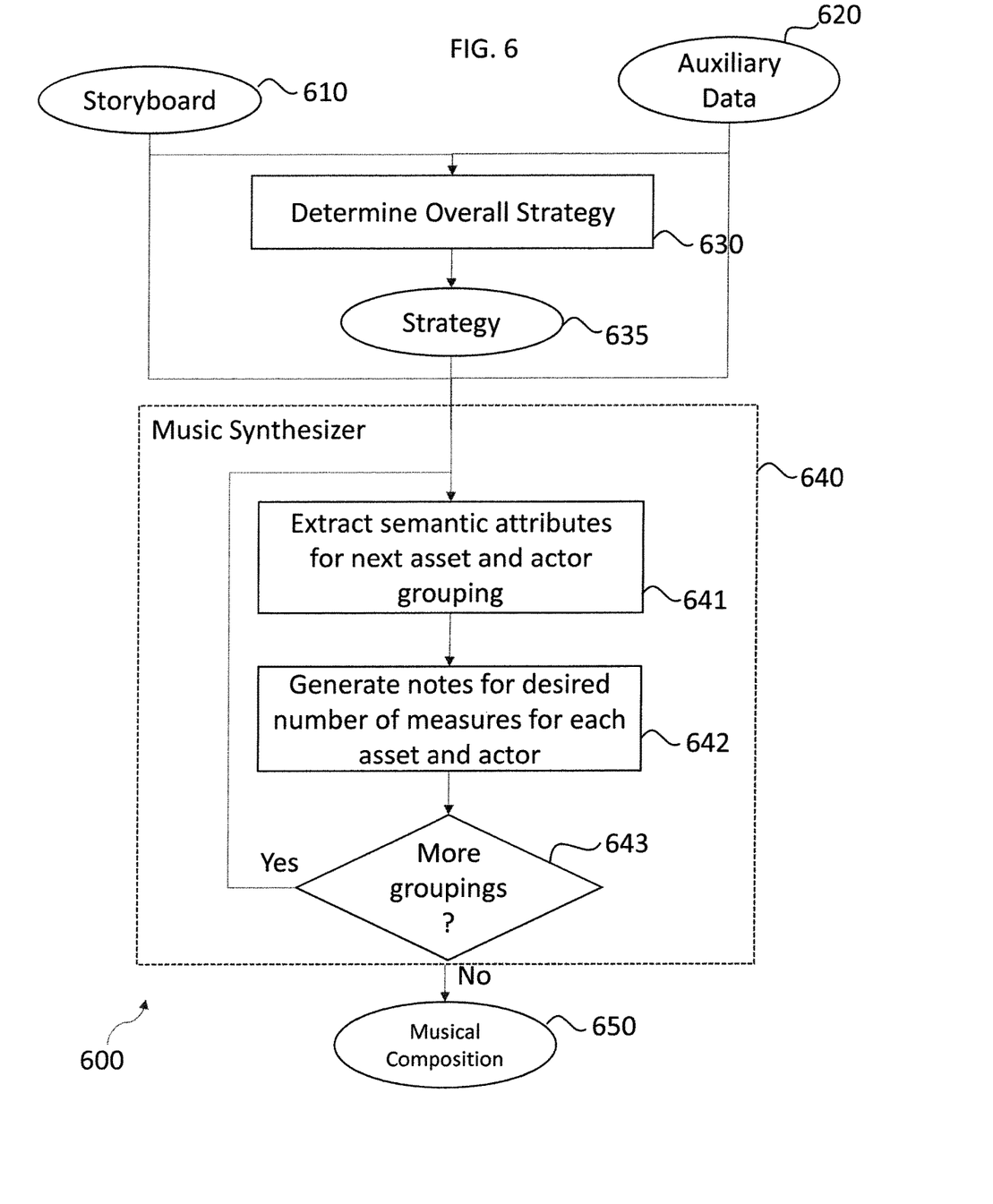
FIG. 6 illustrates a music synthesis flow chart according to the method of the present invention.

For each grouping in the storyboard, the music synthesizer will extract the set of relevant semantic attributes for each asset and actor. At any given time, a typically small number of voices will be generated. An embodiment of the present invention has a dominant voice that runs for the entire duration of the generated music piece, and where the notes for this voice are based upon overall scene and emotive tags. An embodiment of the present invention also generates a small number of secondary voices for recurring actors. Such actors may include the appearance of an animate or inanimate object that recurs in multiple images. At a minimum, the notes may be generated by adopting a strategy similar to the strategy applied in the work of Davis and Mohammad in TransProse, where emotional densities are computed and use to drive note generation. Whereas TransProse uses literary analysis to determine emotions, semantic and image analysis provides the basis for identifying emotion.

An important aspect in determining the overall strategy is to identify the emotional high and low points of the image sequence, so as to appropriately define the starting musical elements. For example, if the sequence of imagery transitions from neutral to high positive emotion, then the audio may to start at a lower pitch or slower tempo to build up to the higher emotion moments. The determination of the overall strategy also identifies recurring actors (again, people, other animate objects, or inanimate objects), to determine the suitability of associating particular recurring musical elements with such actors. As in the work of Davis and Mohammad, an embodiment of the present invention calculates an overall emotional profile for the collection. In some embodiments, the standard measure of term-frequency inverse document frequency is used to characterize the importance of emotional concepts in particular images (corresponding to documents) relative to the entire sequence of imagery in the story (the collection). However, unlike the work of Davis and Mohammad, the emotional profile is only part of what determines the overall musical sound, and is only part of what is considered in determining the music generation strategy. Recurring thematic elements and/or actors also factor into the overall strategy.

Associated certain characteristics sounds (instruments) and/or chords with certain types of identified semantic concepts and features may be accomplished in a variety of ways. Associations may be determined by using machine learning techniques to analyze musical compositions, considering the lyrics of the songs, to determine if certain musical elements can be commonly associated with certain semantic concepts. However, such an approach requires considerable analysis and clear associations may not be readily determinable. In the most straightforward approach, a predetermined table is used to map concepts to the appropriate instrument and/or chord or chord progression. This table can be populated by a person or persons with expertise in the field, specifying associations for key concepts for the expected domain. For example, for consumer imagery, identifying concepts such as celebrations, including various types of celebrations (birthday, graduation, anniversary), ceremonies (such as wedding and graduation), activities (eating, relaxing, hiking, sleeping, various athletic activities), and objects (such as large and small cats or dogs, cars, motorcycles) and associating appropriate musical motifs can be accomplished by a subject matter expert. This association can be further refined by associating a particular persona or demographic group with a user, and using that to drive the association.

For example, different sounds could be associated with different animals, and even different size of animals. By consistently using the same sound for the same actor or object as it repeats over a sequence of imagery provides a degree of continuity and cohesion to the synthesized music. Classical musicians, such as Saint-Saëns in his piece The Carnival of the Animals, used different instrumentation to evoke different animals. The use of image understanding algorithms to identify specific objects combined with predetermined association mappings enables instrumentation and sound to vary based upon the objects, animate or inanimate, portrayed in a picture. The number of detected objects can also be reflected in the number of voices, with the number varying from image to image as the number of detected objects varies. For example, if a set of pictures initially portrays just one person that might be reflected in the music initially having a single voice or track; as additional people (or other significant objects, such as pets) appear and disappear, the number of voices may vary. Some playback experiences even allow for "4D" experiences, offering sensory input beyond the usual visual and auditory stimuli, such as wind and/or fog effects. Where playback support is available, tracks to drive such experiences can also be generated, driven in the simplest embodiments by the image scene data.

Similarly, different activities can also translate to different sounds. A high energy activity, such as a picture of a sporting event, may translate to music where the tempo is fast and/or the notes are short in duration. A low energy activity, such as a picture of a couple sitting together and enjoying a beverage may translated to music where the pace is much more relaxed, and the notes are longer in duration. The sound may be further influenced by the setting. A couple pictured enjoying a beverage on a dock next to a lake evokes a different mood than a couple enjoying beverages at café. The sound may be further enhanced by adding regional tonal differences. For example, certain musical sounds may be associated with certain regions. Especially for vacation pictures, where the pictures are taken in a place different than a person's home, evoking the sounds of a region may further enhance the quality of the synthesized music. This can be accomplished in part by using musical instruments commonly associated with a geographic region, such as steel drums with the Caribbean, dulcimers with Appalachia, bagpipes with Scotland, etc. The ability of the system of the present invention to recognize and classify event types, such as vacation, enables it to selectively determine when to use such motifs. This allows it differentiate between when the location represents the user's home location, and when it represents a travel destination.

Likewise, commonly recognized tunes associated with places or geospatial features may be incorporated into the synthesized music. Location information may also be used to adjust other musical qualities, complementing concepts generated using computer vision semantic analysis. Combining location information with other semantic information may provide a deeper basis for the musical elements. A picture of a canoe on a placid lake in the early morning might evoke slower, possibly higher pitched sounds than a picture of a race boat on choppy water. Information from auxiliary sources may also be used to further set the mood for the music. For example, outdoor pictures taken on a windy day may result in more turbulent sound music than pictures taken on a calm, sunny day. A variety of web services can provide historical weather information for a given locale and time.

The genre or instrumentation of music may also be influenced by other types of image features or metadata, besides location. For example, detecting cowboy hats may give rise to a sound having a country-western feel; detecting beaches and/or surf boards may cause the music synthesizer to evoke an instrumental surf sound, with electric guitars and a reverb effect; detecting pictures of a cathedral may cause the synthesizer to generate a majestic sound perhaps incorporating an organ; detecting celebratory events may cause the music synthesizer to use a bright, brassy sound.

In addition, in some embodiments, ambient sounds associated with certain scenes or activities may be incorporated into the synthesized sounds. For example, beach scenes may result in the inclusion of the sounds of waves; forest scenes may include bird songs, etc. Scenes of celebrations could include as one of voices the sound of applause or cheering. These types of sounds could either be completely synthesized or prerecorded, and incorporated into the generated audio.

The activity or objects portrayed in image influence not only the tonal quality and tempo but may also influence the volume or degree of loudness. High energy activities or pictures portraying emotions such as surprise or anger may be result in higher volumes; lower energy activities or calmer emotions may translate to lower volumes. Varying the volume across the sequence of content within a bounded range can further enhance the interest and quality of the audio. Even in the absence of highly descriptive semantic information, visual qualities of an image may translate into different volume levels.

Semantic image analysis can also provide the basis for sentiment analysis. This analysis can happen at two levels. The first is to identify the facial expressions of people portrayed in the images. For example, do they appear angry or happy, surprised or sad? As noted previously, basic facial features such as the shape of the mouth and eyes can be detected using commercially available libraries, such as the Omron Image Sensing Technology, which can further interpret this data to indicate the degree to which a person is smiling, representing happiness, or blinking. An embodiment of the present invention modulates this data by considering how these qualities differ compared to a person's normal facial expression. This modulation is accomplished by maintaining for a given user a set of commonly portrayed individuals, and for each such individual, maintaining a reference set of face images, providing a benchmark for comparison. An expression that might appear as smile for one person might be another person's regular expression, and so on, making this type of adaptation important. This companion database can be further enhanced by analyzing the pictures from which the faces were extracted, and using semantic analysis to further predict a person's expression. For example a picture of a person portrayed at their birthday party is more likely to be smiling or perhaps to show surprise than to show anger or some other negative emotion. Such benchmark data may be further enhanced by prompting the user to characterize the emotion being displayed, as the people that know a person best are best able to read the person's expression; however, such user-provided data is not required for the operation of the system. Note that the larger the corpus of image data available, the better the system's ability to characterize facial expressions. In an embodiment of the present invention, the system is not limited to just the set of imagery used in the story at hand, but has access to potentially the user's entire set of imagery, gathered over multiple years.

The emotional association of an image can be further enhanced by considering the set of semantic tags associated with the image by a semantic image tagger. This step is particularly important for images that do not portray people, but is useful in any case. Not only does the semantic analysis provide the guidance as described previously, specific emotions can also be associated with certain concepts, which can then be incorporated into the musical synthesis in a manner similar to the approach described by Davis and Mohammad, which provides emotional annotations or associations for approximately 14,000 words. A simpler approach uses the WordNet Affect Lexicon, which associates one of six so-called Ekman emotions (joy, sadness, anger, fear, disgust and surprise) with a corpus of a few hundred words. In an embodiment of the present invention, semantic labels provided by the semantic tagger are mapped to an emotion using one of these association mappings. In addition, some emotive concepts may be returned directly by the semantic tagger for certain types of imagery. The emotions associated with an image may be further enhanced by associating emotions with facial expressions. Note that a given image may have conflicting emotions, in which case the dominant emotion is computed. Note that the dominant emotion may be dependent upon the viewer. For example, competing players in a sporting event may display very different emotions; the emotion associated with the player who is most closely associated with the viewer should be the dominant emotion.

In some embodiments, the synthesized music may further incorporate measures of music from commonly recognized tunes, such as holiday tunes or the music for singing happy birthday, for certain types of events. Tunes associated with specific places or institutions, such as a college's alma mater song, may also be incorporated in such embodiments. Tunes may also be associated with certain types of detected people or objects, such as a lullaby with a baby, or the Pink Panther theme music with a cat. Access to such tunes is in addition to or instead of simply associating certain genres or instrumentation with particular semantic concepts or image features. However the present invention does not require knowledge or access to previously generated tunes, but is fully capable of synthesizing musical elements based upon the image analysis.

Visual qualities of an image may also be used to determine other image characteristics. While higher-level semantic information is generally to be preferred, in the absence of high quality semantic information, or where the semantic information lacks sufficient diversity across the image set, analyzing the image hue, saturation and brightness may provide the basis for varying the musical quality of an image. For example, an image with a lot of contrast may result in musical elements that likewise have lots of dynamic contrast, such as loud and soft notes in relatively close juxtaposition, or in complex chord structure. The method of expressing the differences may vary; for example, an image with high contrast may also be reflected in shorter, possibly syncopated notes versus more of a gliding sound for low contrast imagery. It may also be reflected in the degree of variation in pitch between adjacent notes, with high contrast imagery resulting in a greater degree or spread of the pitch across the notes. Similarly, brightly illuminated imagery may be reflected in higher pitches than dimly illuminated imagery. Image saturation may also be reflected in the musical elements in a variety of ways. All these elements may be combined together to determine the set of associated musical elements. Identification of recurring occurrences of hue, saturation and brightness may result in a recurring theme that, as previously described, is manifested in a recurring set of musical elements. In this case, the application of a smoothing function is applied in some embodiments to provide a more pleasing sound. The smoothing function is used to even out changes in any of the musical elements.

Some embodiments may consider other capture metadata such as the focal length or subject distance, for example to determine that the photographer has zoomed in or out on a particular subject. This property may be reflected in the music by corresponding changes in volume or intensity. In the case of video objects, the rate at which the photographer zoomed in or out on a particular subject may further be reflected in the music. In a similar manner, more complicated image analysis techniques may be used to identify the relative position and size of a given subject across multiple images. Changes in size may again be reflected, for example, by changing the sound intensity or volume; significant changes in position across a series of images may result for example in increased tempo. Image analysis techniques such as SIFT/SURF can be used for identifying the same object across different pictures according to the present invention.

The storyboard associated with an image sequence represents a certain structure. In some embodiments, this structure may be further annotated so that higher-level semantics may be associated with constituent parts. For example, a storyboard formed over a sequence of images shot at a wedding may be annotated to differentiate between the different parts of the event: the pre-ceremony activities, the ceremony, the reception, etc. These annotations may be determined by analyzing the semantic tags provided by a semantic tagger; some embodiments may also incorporate predetermined knowledge of common event structures. These subevents may themselves be further refined. In some embodiments, the determination of the overall strategy may be dependent upon these annotations to further refine the style of generated music. Again, certain associations can be commonly associated with each of the constituent parts: anticipatory sounds during the pre-ceremony; more formal, majestic sounds during the ceremony, more casual and festive sounds during the reception, etc.

While the system of the present invention as described has largely operated over the image set associated with the story for which a musical composition is being generated, the behavior of the system can be enhanced through access to a more extensive collection of images owned or accessed by the user. Consulting the broader collection of imagery can not only provide better determination of normal facial expressions, as previously noted, but can also provide information in many other areas, including the relative importance of people, places and things. In some embodiments, the some or all of the work done by the system can be preserved across sessions, enabling it to reuse motifs or other musical elements, for example, to introduce some degree of commonality between compositions.

The invention has been described in detail with particular reference to certain embodiments thereof, but it will be understood that variations and modifications can be effected within the spirit and scope of the invention.

PARTS LIST 100 flow chart
110 multimedia collection step
120 metadata generator step
130 metadata step
140 storyboard generator step
150 storyboard step
160 music generator step
170 musical composition step
180 playback step
190 auxiliary data step
200 feature table
302 flow chart
300 compute step
310 add image step
315 more images step
320 analyze next image step
330 identify features step
340 sufficient features step
350 current set sufficient step
360 output current set step
370 resent current set step
380 current set sufficient step
390 output current set step
392 method completed step
402 quality table
404 quality table
500 block diagram
502 temporal grouping
504 temporal grouping
506 temporal grouping
508 thematic grouping
510 thematic grouping
512 thematic grouping
514 image group
516 image
518 image group
520 image group
600 flow chart
610 storyboard step
620 auxiliary data step
630 determine overall strategy step
635 strategy step
640 music synthesizer
641 extract semantic attributes step
642 generate notes step
643 more groupings step
650 musical composition step
700 flow chart
710 image content step
720 extract camera metadata step
730 extract colors step
740 brightness and contrast step
750 facial detection step
760 semantic tags step
770 augment metadata step
780 geospatial map step
790 temporal data map step

The invention claimed is:

1. A method of creating an audio track to accompany a sequence of multimedia assets comprising:
    using a processor to analyze extracted metadata and derived metadata from the multimedia assets;
    using the processor to generate a storyboard for the multimedia assets, wherein the storyboard arranges the multimedia assets in a sequence based on the extracted metadata and the derived metadata;
    using the processor to determine an audio track strategy based on an analysis of the sequence of multimedia assets; and
    generating an audio track in accordance with the audio track strategy to accompany the selected subset of multimedia objects.

2. The method of claim 1 wherein the storyboard arranges the multimedia assets in a sequence based upon temporal event clustering.

3. The method of claim 1 wherein the method of generating an audio track further comprises identifying recurring thematic patterns within the sequence of multimedia assets.

4. The method of claim 3 wherein the method of identifying recurring thematic patterns comprises at least one of frequent item set mining, face detection, face recognition, location clustering, object detection, scene classification, activity detection, sentiment analysis, and event classification.

5. The method of claim 1 wherein the method of generating an audio track further comprises a varying musical structure, including at least one of instrumentation, tonality, key, tempo, volume or chord structure, based upon the extracted and derived metadata.

6. The method of claim 5 wherein the derived metadata comprises an identification of animate and inanimate objects, scenes or activities.

7. The method of claim 6 wherein the identification of animate objects comprises an identification of the size of the portrayed object.

8. The method of claim 5 wherein the derived metadata comprises a determination of one or more of: visual complexity, depth of field, contrast, brightness and saturation of an image in the sequence of multimedia objects.

9. The method of claim 5 wherein the extracted metadata comprises properties including one or more of: lens focal length and subject distance.

10. The method of claim 1 wherein the method of generating an audio track further comprises sentiment analysis.

11. The method of claim 10 wherein the sentiment analysis comprises detecting changes in sentiment.

12. The method of claim 11 wherein the sentiment analysis comprises associating sentiments with semantic concepts from image analysis.

13. The method of claim 11 wherein the sentiment analysis comprises associating sentiments with facial expressions.

14. The method of claim 6 wherein the identification of animate and inanimate objects comprises identifying recurring occurrences of objects, scene or activities that are reflected in corresponding recurring musical elements.

15. The method of claim 5 wherein the method of generating an audio track is responsive to a person portrayed in a multimedia asset, a location of where the multimedia asset was captured, or a time when the multimedia asset was captured.

16. The method of claim 5 wherein the method of generating an audio track is responsive to a person listening to the audio track.

17. The method of claim 1 wherein the method of generating an audio track comprises pre-recorded songs associated with a detected location, time, activity or person.

* * * * *